United States Patent
Risser et al.

(10) Patent No.: US 7,415,051 B1
(45) Date of Patent: Aug. 19, 2008

(54) AIR COOLER LASER APPARATUS AND METHOD

(75) Inventors: Chris J. Risser, Scottsdale, AZ (US); Stefano J. Noto, Mesa, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 615 days.

(21) Appl. No.: 10/463,105

(22) Filed: Jun. 16, 2003

(51) Int. Cl.
*H01S 3/04* (2006.01)

(52) U.S. Cl. .......................... 372/34; 372/36

(58) Field of Classification Search ............. 372/35, 372/34, 36
See application file for complete search history.

(56) References Cited

U.S. PATENT DOCUMENTS

| | | | |
|---|---|---|---|
| 4,291,282 A | 9/1981 | Alfano | |
| 4,612,646 A * | 9/1986 | Zerr | 372/58 |
| 4,823,349 A | 4/1989 | Koop | |
| 4,852,114 A | 7/1989 | Karube | |
| 5,253,261 A | 10/1993 | Chaffee | |
| 5,481,339 A * | 1/1996 | De Cock et al. | 399/93 |
| 5,550,853 A | 8/1996 | Ostler | |
| 5,636,103 A | 6/1997 | Bushner | |
| 5,901,167 A * | 5/1999 | Sukhman et al. | 372/58 |
| 6,104,607 A | 8/2000 | Behl | |
| 6,323,462 B1 * | 11/2001 | Strand | 219/388 |
| 6,746,000 B2 * | 6/2004 | Watanabe et al. | 254/134.4 |
| 6,853,668 B1 * | 2/2005 | Taufenbach | 372/64 |
| 2003/0002252 A1 | 1/2003 | Pokharna et al | |
| 2003/0063639 A1 * | 4/2003 | Yatskar et al. | 372/36 |

* cited by examiner

*Primary Examiner*—Dung T. Nguyen
(74) *Attorney, Agent, or Firm*—Perkins Coie LLP

(57) ABSTRACT

An air cooled laser includes a laser housing with a laser module and heat sinks therein connected to a high pressure blower structure for causing an airflow to remove heat from the heat sinks and maintain the laser module at a stable operating temperature.

41 Claims, 4 Drawing Sheets

AIR COOLER LASER APPARATUS AND METHOD

FIELD OF THE INVENTION

This invention relates to methods and apparatus for air cooling a laser, and more particularly to air cooling a laser to achieve efficiency in combination with size reduction.

BACKGROUND OF THE INVENTION

Temperature is one of the main factors in determining the output power obtainable from a laser. Therefore, management of the heat generated during laser operation is critical to overall performance, and one aspect of the problem of maintaining a controlled thermal environment is to provide a cooling system which efficiently and effectively dissipates the heat.

Heat dissipation can be accomplished by several methods, principally by liquid cooling or air cooling. Liquid cooling directly pumps liquid through either the cavity or electrodes and removes the heat generated in the lasing media. Air cooling also removes the heat generated in the lasing media and dissipates it outside the laser cavity by forcing air over external heat sinks. Each method has its advantages and disadvantages.

The overall size of a forced air cooled laser has tended to be significantly larger than that of a liquid cooled laser due to the need for heat sinks with large surface areas, fans and their mounting provisions and enclosures to direct the air across the heat sinks. Examples of such prior art air cooled laser structures may be found in U.S. Pat. Nos. 5,901,167, 5,550,853 and 5,253,261. This size constraint has put conventional air cooled lasers at a disadvantage when space constraints are an issue.

A primary disadvantage of conventional air cooled lasers as compared with liquid cooled lasers is that liquid cooled lasers have had the ability to operate over a wider temperature range without significant degradation in performance.

However, while liquid cooling is efficient, it has several disadvantages as well. One problem is that condensation can occur in humid environments when the liquid temperature is not managed carefully enough or when the ambient temperature changes. Condensation can damage the optics and electronics.

Another problem is that the chillers/heat exchangers for cooling the liquid are expensive, bulky and prone to require maintenance. Additionally, leaks of the cooling liquid can damage the laser as well as other equipment in the vicinity of the leak.

Conventional air cooled lasers such as disclosed in the three cited patents have traditionally employed AC/DC cooling fans with low pressure capability (0-5 inches of water). Fans with limited pressure capability force the use of heat sinks with a low surface area to volume ratio. This results in a structure having a few tall fins with large gaps in between. The limited pressure capability of these fans also requires their close proximity to the heat sinks, further enlarging the laser package. Therefore liquid cooling (typically using water) has tended to be the non-exotic cooling method of choice for cooling a laser when small size and a wide temperature range are required.

Accordingly, there remains a need for a structure and method that enables an air cooled laser to achieve efficient heat dissipation in combination with minimal size and the ability to operate over a wider temperature range without the disadvantages of water cooling.

SUMMARY OF THE INVENTION

It is therefore an object of the present invention to provide a laser with a forced air cooling system that avoids the above-described difficulties of the prior art.

The present invention is directed to an improvement in air cooling a laser that reduces the size of an air cooled laser and improves its cooling efficiency.

Thus, the present invention in one embodiment is directed to an air cooled laser, comprising a laser module for containing therein a lasing medium and having a plurality of external heat sinks, and a laser housing for holding the laser module therein, the laser housing having an air intake structure for admitting air into the laser housing and an air outlet structure for permitting removal of air from the laser housing, the laser housing defining a pathway for the passage of air from the air intake structure, over the heat sinks and out of the air outlet structure.

Further, a laser in accordance with this embodiment of the invention comprises a high pressure blower structure connected at the laser housing for causing an airflow in which air is drawn from the air intake structure, over the heat sinks and out of the air outlet structure to remove heat from the heat sinks. This structure enables the laser module to maintain a stable operating temperature.

In a preferred embodiment, the high pressure blower structure is connected to the air outlet structure and the airflow within the laser housing is in a direction toward the high pressure blower structure. Alternatively, the high pressure blower structure may be connected to the air intake structure and the airflow within the laser housing is in the opposite direction away from the high pressure blower structure.

Still further, the high pressure blower structure may be connected as a component of the laser housing, connected directly to the laser housing or connected remotely to the laser housing.

In another aspect of the present invention, corresponding methods for air cooling a laser are provided.

These and other objects, features and advantages of the present invention will be apparent from the following detailed description of the preferred embodiments taken in conjunction with the following drawings, wherein like reference numerals denote like elements.

DETAILED DESCRIPTION OF THE PREFERRED EMBODIMENTS

In accordance with advantageous aspects of the present invention, methods and apparatus for cooling a laser require the use of a high pressure blower structure, capable of high flow rates at 50 to 150 inches of water while at the same time allowing the fin surface area or overall fin volume to be reduced significantly. The blower structure used in accordance with the present invention uses one or more high pressure blowers, which are defined herein as devices able to pull a useful amount of air for cooling a laser (50 cubic feet/minute or more) against a back pressure or restriction of at least 20 inches of water.

It is noted that a conventional fan used in prior air cooled lasers can only pull this amount of air against a restriction of 0.25 to 0.75 inches of water.

Another advantage of the high pressure capability in accordance with the present invention is the option of locating the blower remotely, with the air drawn across the heat sinks on the laser and through a duct such as a flexible hose to the blower.

The high pressure capability also allows the heat sink surface area or overall fin volume to be reduced significantly, with typically 0.25 to 0.50" tall fins spaced 0.05" to 0.15" apart.

All of this is due to the fact that high pressure motors can overcome significant restrictions to air flow (i.e. short fins with small gaps and long hoses) and move enough air across the laser heat sinks to maintain the required heat removal rate.

Figure 1:
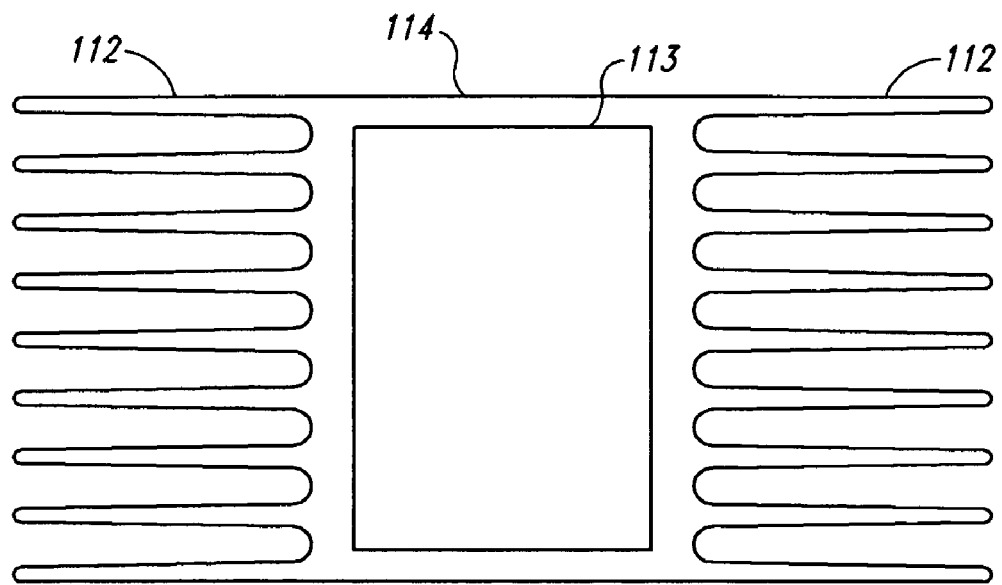
FIG. 1 is a top view of a heat sink with fins in a conventional arrangement.
Figure 3:
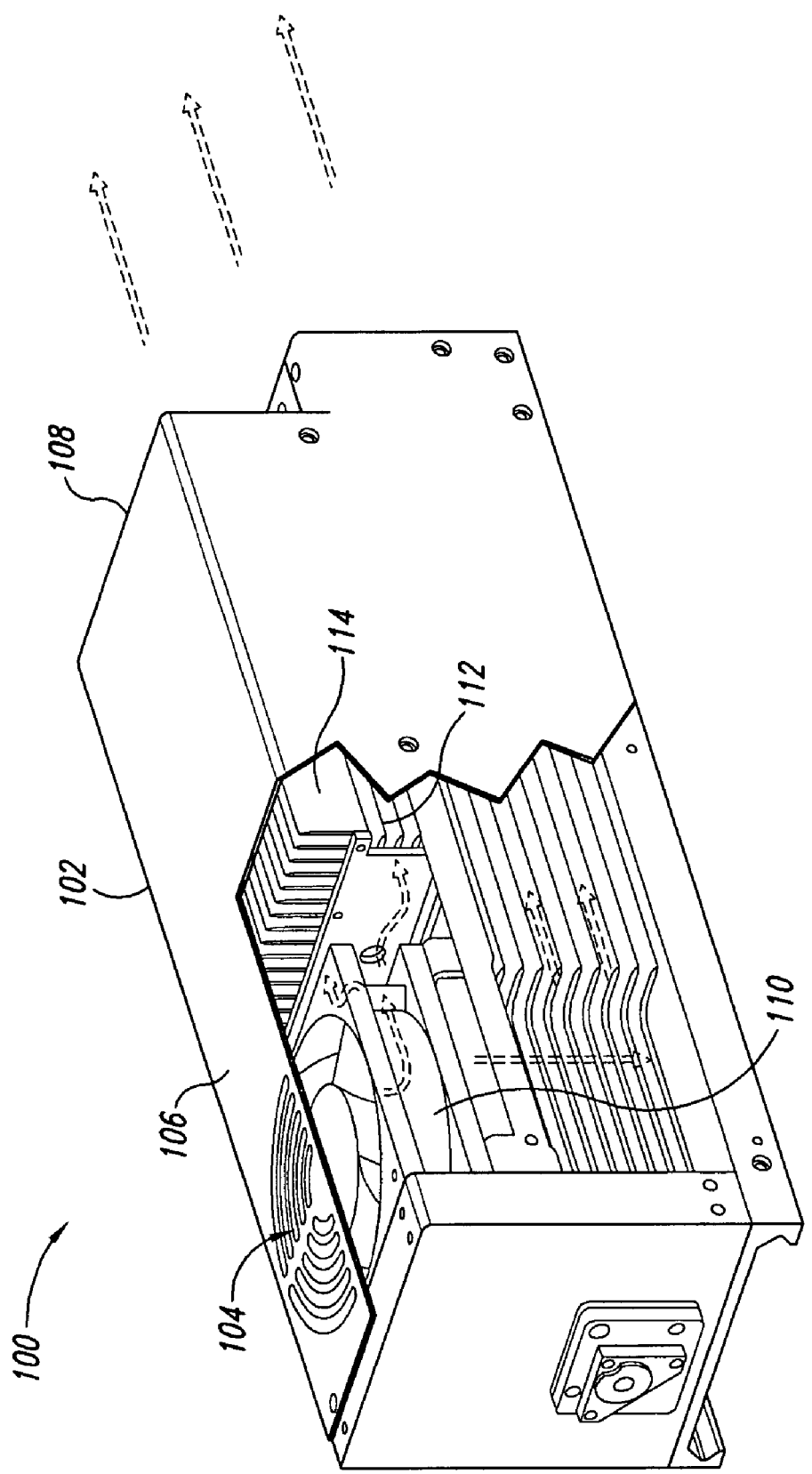
FIG. 3 is a side view in partial cutaway of a conventional air cooled laser.

FIG. 1 illustrates the fin structure of a conventional air cooled laser heat sink 112 with a center opening 113, while FIG. 3 illustrates a conventional air cooled laser 100, shown in partial cutaway. The laser 100 generally includes a laser housing 102 with all air intake 104 in the top wall 106 and an air exhaust (not illustrated) in one of the end walls 108. Air is drawn into the laser housing 102 through the air intake 104 by a cooling fan 110 positioned inside the laser housing 102. The air then flows in the direction of the dashed arrows over the fins 112 of the heat sink 114 (FIG. 1) and then out through the air exhaust, indicated by arrows A in dashed lines.

FIG. 3 illustrates a typical size for a conventional carbon dioxide gas laser housing 102 as 6.25" high by 5.25" wide 19.00" long. The cooling fan 110 is a low power fan because it is positioned directly over the fins 112, but the laser housing 102 must be large enough to encompass the cooling fan 110. Furthermore, as noted above, the fins 112 themselves must be large and widely spaced, as shown in FIG. 1. The tins 112 are typically 1.0" to 2.5", with large gaps in between, typically 0.25" to 0.5".

Figure 2:
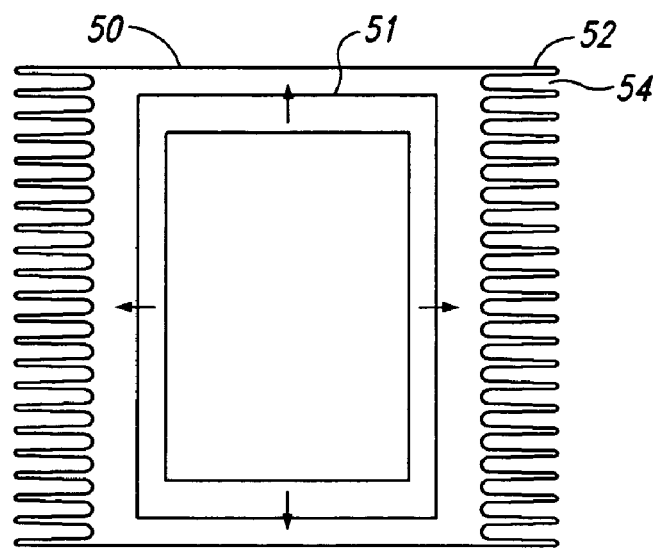
FIG. 2 is a top view of a heat sink with fins in an arrangement in accordance with the present invention.
Figure 4:
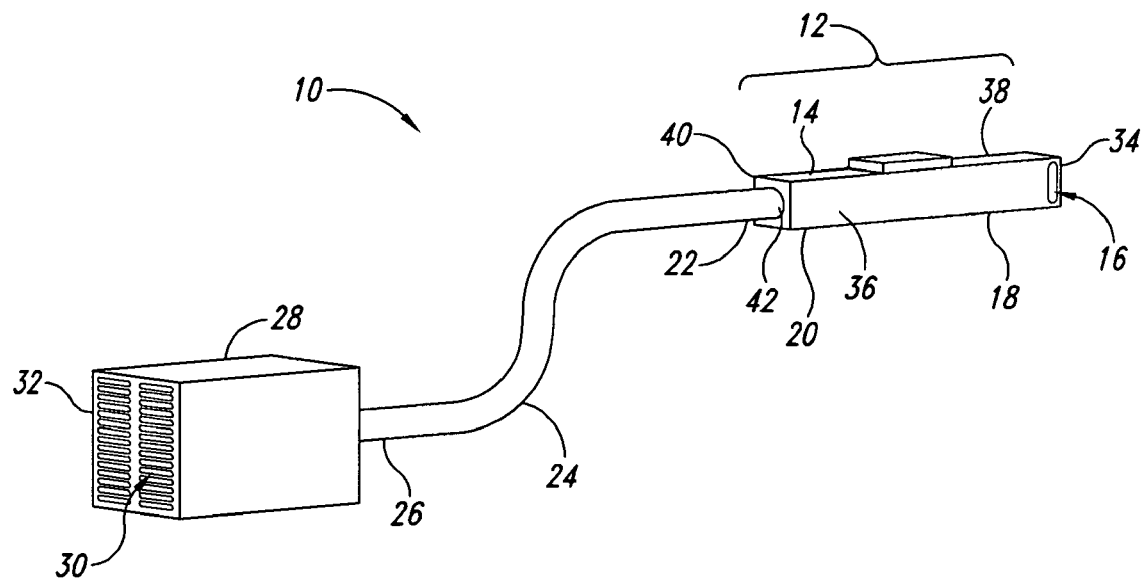
FIG. 4 is an elevational view of an embodiment of an air cooled laser in accordance with the present invention.

FIG. 4 is an elevational view of a first preferred embodiment of a forced air cooled laser 10 in accordance with the present invention, and FIG. 2 is an illustration of a heat sink 50 with a central opening 51 that may advantageously be used in the laser 10.

Laser 10 includes a relatively small laser housing 12 in which a laser module 14 containing the lasing medium (not illustrated) and an appropriate number of the heat sinks 50 are enclosed. An air intake structure including one or more air intakes 16 is provided in the laser housing 12 at one end 18 thereof and on both sides, through which ambient air may be drawn into the laser housing 12 and over the heat sinks 50.

At the other end 20 of the laser housing 12, an air outlet structure 42 is provided. In this embodiment, the air outlet structure 42 is in the form of an opening to be fitted with one end 22 of a duct, such as a conduit or hose 24. The hose 24 is advantageously flexible and defines a pathway through which the air that has absorbed the heat from the heat sinks 50 can be withdrawn from the laser housing 12.

The other end 26 of the hose 24 is fitted to a support housing 28 that houses a high power blower structure including one or more high power blowers (see FIG. 6), having individually or in combination the high power operating characteristics defined above. In this embodiment, each high power blower is a vacuum blower. The vacuum blower forces the air flow from the air intakes 16 through the laser housing 12 and hose 24 and then out of an air exhaust 30 on a wall 32 of the support housing 28.

The air intakes 16 can advantageously be provided on either an end wall 34, side wall 36 or top wall 38 at the end 18 of the laser housing 12 and the opening 42 at the other end 20 is advantageously on the opposed end wall 40, but may be positioned on the side wall 36 or top wall 38.

The conventional low power fans included in the prior art laser housings, such as laser housing 102 shown in FIG. 3, required the laser housings to be relatively large. In contrast, in accordance with the present invention, the high power blower is powerful enough even to be removed from the laser housing. With this increased power, the heat sinks 50 can be reduced in size and increased in density. For example, the heat sink 50 has a reduced heat sink surface area or overall fin volume, with 0.25" to 0.50" tall fins 52 separated by spaces 54 that are 0.05" to 0.15" wide.

The result is that the overall laser housing 12 can be reduced in size and the support housing 28 with the blower can, as in this embodiment, be located remotely. This allows the laser housing 12 to fit into tighter spaces.

For example, the laser housing 12 in a specific working embodiment may advantageously be 3.00" high by 3.00" wide by 16" long. It will be understood that the given dimensions for the heat sink 50 and the laser housing 12 are by way of example only and that the present invention is not limited to such dimensions. Nevertheless, this specific example serves to demonstrate the substantial reduction in size of the laser housing that may be achieved in accordance with the present invention. This reduction in size can be achieved because the high pressure blower can pull an amount of air equivalent to or greater than a low pressure fan through a much more restrictive space, enabling it to adequately remove the heat from a smaller package.

The hose 24 may also advantageously be used as a power conduit for the laser elements, with the support housing 28 including the appropriate power supplies (not illustrated).

Thus, in a preferred embodiment, the support housing includes a vacuum motor providing power to the blower and also houses the DC and RF power supplies for the laser. Power and airflow are then provided to the laser through a 1.5" diameter, 12 feet long duct. Using this method, a typical 50 watt laser can be adequately cooled using twelve 0.50" tall fins, reducing the laser cross section 40% to 50% over the cross section required to cool the laser with traditional fans.

With this structure, the laser 10 is also more easily transported and set up. This is particularly important for the laser housing 12, which may be handled with greater security for its internal elements due to its decreased size and weight. In addition, the use of a duct such as the flexible hose 24 increases the flexibility in the set up of the laser 10 in its desired position.

Figure 5:
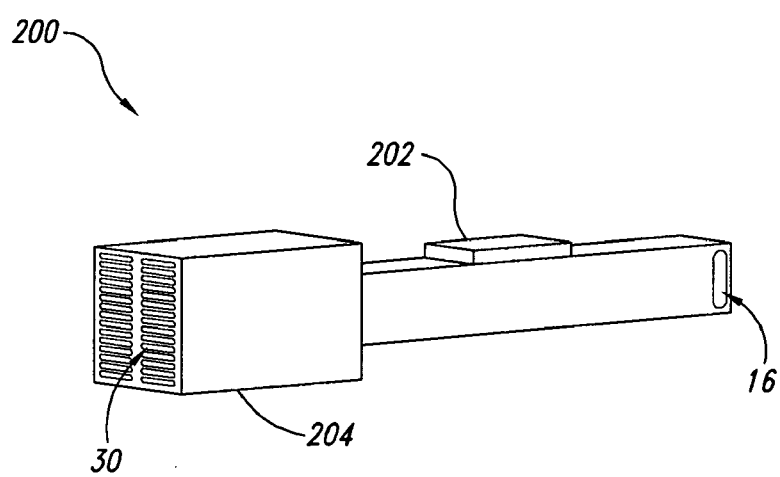
FIG. 5 is an elevational view of another embodiment of an air cooled laser in accordance with the present invention.

Other embodiments of lasers in accordance with the present invention are also contemplated. For example, as shown in FIG. 5, a laser 200 in accordance with the present invention may have its laser housing 202 directly connected to the separate blower structure 204. The laser housing 202 and blower structure 204 can be handled and moved separately and then connected when in position for use.

In another development, if a high power blower is provided in a small enough size, it can even be positioned in the laser housing.

In the embodiments discussed above, the blower structure is connected to the air outlet structure and the airflow within the laser housing is in the direction toward the blower, i.e. the blower pulls the air toward itself using, for example, vacuum power. In other embodiments, the blower structure may be connected to the air intake structure and the airflow within the laser housing will be in the direction away from the blower structure. This may be envisioned from the structure of FIG. 3, with the air intakes 16 being instead an air outlet structure through which air is exhausted from the laser housing 12 and with the opening to which the hose 24 is connected being instead an air intake structure. In these embodiments, the blower structure blows toward the laser housing 12, rather than pulling it away. A similar modification is possible for the embodiment of FIG. 5 and any other embodiment.

Figure 6A:
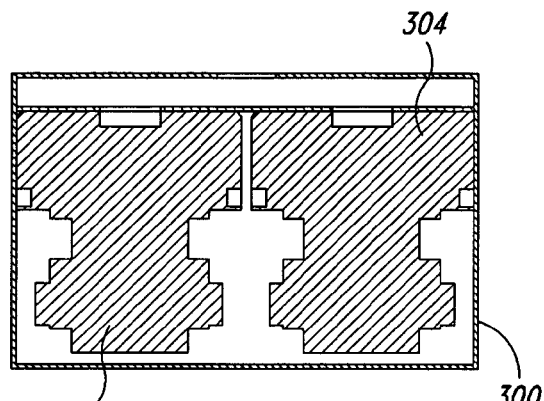
FIG. 6A is a view of a support housing including one or a plurality of high pressure blowers.
Figure 6B:
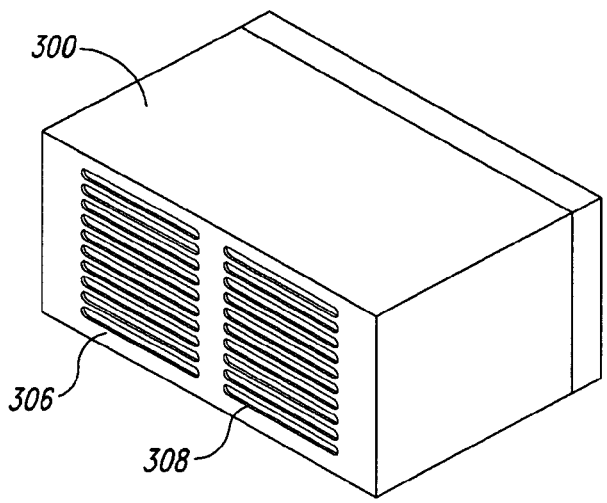
FIG. 6B is a cross-sectional view of the support housing of FIG. 6A.

In some embodiments, the blower structure may include a plurality of blowers, and the blower speed may be fixed or variable. As shown in FIGS. 6A and 6B, for example, the support housing 300 can enclose one blower 302 or two blowers 302, 304, as appropriate for the application. Additional blowers as needed may be added. It more than one blower is used, the air exhaust may be formed in sections, such as sections 306, 308.

In a still further development, the laser housing 12 or 202 may be provided with a temperature measuring device or devices for measuring a temperature indicative of the current temperature of the included laser module. This measured temperature may be a temperature of the laser module itself, a temperature of the airflow or any other useful temperature.

Figure 7:
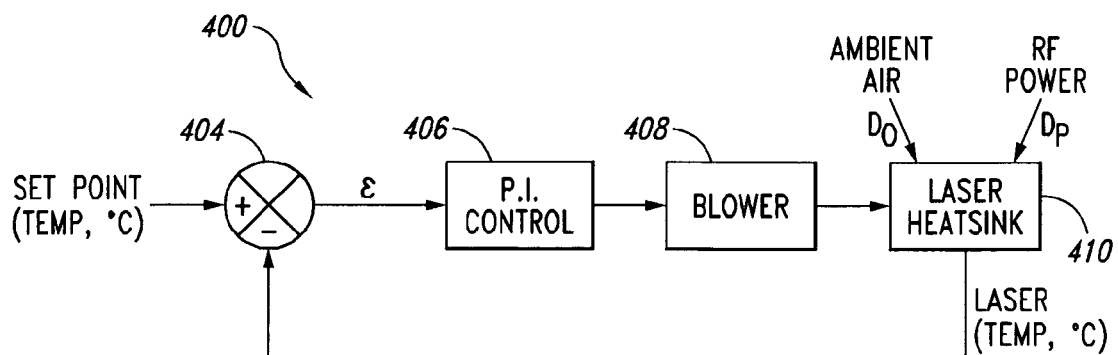
FIG. 7 illustrates a temperature controlled feedback loop for blower speed in accordance with the present invention.

In any case, the blower speed may be variable and be actively controlled with feedback from the temperature measuring device to maintain any desired operating temperature for the laser module. FIG. 7 illustrates a block diagram of a blower speed control scheme 400 based upon a laser temperature feedback loop 402. In the scheme 400, the set point, i.e. the desired operating temperature, is one input to a comparator 404, with the second input being the detected laser temperature. The appropriate adjustment to the blower speed is determined in the control 406 and implemented in the blower structure 408. Detected laser temperature is a function of the ambient air temperature Do, the RF power Dp applied and the air flow rate over the heatsink 410. The structure and operation of control schemes such as scheme 400 are of course well known, and any such scheme may be used as desired.

While the disclosed methods and apparatus have been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. An air cooled laser comprising:
    a laser module including a lasing medium having a longitudinal axis and an external heat sink having a rectilinear opening attached to said laser module, wherein said heat sink has fins extending longitudinally parallel to the longitudinal axis;
    a laser housing containing said laser module, said laser housing having an air intake structure for admitting air into said laser housing and an air outlet structure for permitting removal of air from said laser housing, said laser housing defining a pathway for the passage of air from said air intake structure, over said heat sink and out of said air outlet structure; and
    a high pressure blower structure connected at said laser housing for causing an airflow in which air is moved in the direction of said longitudinal axis from said air intake structure, over said heat sink, and out of said air outlet structure to remove heat from said heat sink.

2. The laser of claim 1, wherein said blower structure is connected to said air outlet structure and the airflow is in a direction toward said blower structure.

3. The laser of claim 2, wherein said blower structure is connected to a duct that is connected to said air outlet structure to receive air output through said air outlet structure, the air received in said duct being withdrawn therefrom by said blower structure.

4. The laser of claim 3, wherein said duct is a flexible hose.

5. The laser of claim 2, wherein said blower structure is directly connected to said laser housing to receive air output through said air outlet structure.

6. The laser of claim 2, wherein said blower structure includes one high pressure vacuum blower.

7. The laser of claim 2, wherein said blower structure includes a plurality of high pressure vacuum blowers.

8. The laser of claim 1, wherein said blower structure operates with a fixed blower speed.

9. The laser of claim 1, wherein said blower structure operates with a variable blower speed.

10. The laser of claim 9, further comprising a temperature measuring device for measuring a temperature indicative of a current operating temperature of said laser module, wherein the variable blower speed is actively controlled with feedback from said temperature measuring device to maintain any desired operating temperature for said laser module.

11. The laser of claim 1, wherein said blower structure is connected to said air intake structure and the airflow is in a direction away from said blower structure.

12. The laser of claim 11, wherein said blower structure is connected to a duct that is connected to said air intake structure to force air through said air intake structure into said laser housing and out of said air outlet structure.

13. The laser of claim 12, wherein said duct is a flexible hose.

14. The laser of claim 11, wherein said blower structure is directly connected to said laser housing to force air through said air intake structure into said laser housing and out of said air outlet structure.

15. The laser of claim 11, wherein said blower structure includes one high pressure blower.

16. The laser of claim 11, wherein said blower structure includes a plurality of high pressure blowers.

17. The laser of claim 1, wherein said laser is one of a gas laser and a solid state laser.

18. A method of air cooling a laser, where the laser includes a laser module including a lasing medium having a longitudinal axis and an external heat sink having a rectilinear opening attached to said laser module, wherein said heat sink has fins extending longitudinally parallel to the longitudinal axis, the laser further including a laser housing containing the laser module, the laser housing having an air intake structure for admitting air into the laser housing and an air outlet structure for permitting removal of air from the laser housing, the laser housing defining a pathway for the passage of air from the air intake structure, over the heat sink and out of the air outlet structure, said method comprising:

a first step of connecting a high pressure blower structure at the laser housing; and a second step of using the blower structure for causing an airflow in which air is moved in the direction of said longitudinal axis from the air intake structure, over the heat sink, and out of the air outlet structure to remove heat from the heat sink.

19. The method of claim 18, wherein said first step connects the blower structure to the air outlet structure and said second step causes an airflow in a direction toward the blower structure.

20. The method of claim 19, wherein said first step connects the blower structure to a duct that is connected to the air structure to receive air output through the air outlet structure, the air received in the duct being withdrawn therefrom by the blower structure in said second step.

21. The method of claim 18, wherein said first step connects the blower structure directly to the laser housing to receive air output through the air outlet structure.

22. The method of claim 19, wherein said second step uses one high pressure vacuum blower.

23. The method of claim 19, wherein said second step uses a plurality of high pressure vacuum blowers.

24. The method of claim 18, wherein said second step operates with a fixed blower speed.

25. The method of claim 18, wherein said second step operates with a variable blower speed.

26. The method of claim 25, further comprising a temperature measuring step of measuring a temperature indicative of a current operating temperature of the laser module, and a control step of actively controlling the variable blower speed with feedback from said temperature measuring step to maintain a desired operating temperature for the laser module.

27. The method of claim 18, wherein the blower structure is connected to the air intake structure and the airflow is in a direction away from the blower structure.

28. The method of claim 27, wherein said first step connects the blower structure to a duct that is connected to the air intake structure to force air through the air intake structure into the laser housing and out of the air outlet structure.

29. The method of claim 27, wherein the blower structure is directly connected to the laser housing to force air through the air intake structure into the laser housing and out of the air outlet structure.

30. The method of claim 27, wherein said second step uses one high pressure vacuum blower.

31. The method of claim 27, wherein said second step uses a plurality of high pressure vacuum blowers.

32. An air cooled laser, comprising:

a laser module having a lasing medium and a heat sink including a rectilinear opening and fins extending longitudinally along the lasing medium, wherein the lasing medium is received in the rectilinear opening to transfer heat from the lasing medium to the heat sink;

a laser housing containing the laser module, the laser housing having an inlet through which air passes into the laser housing and an outlet through which air flows out of the housing, wherein the laser housing is configured to direct an airflow through the inlet, over the heat sink, and out of the outlet; and a high pressure blower coupled to the housing for producing the airflow in the housing to dissipate heat from the heat sink.

33. The laser of claim 32, further comprising:

a blower housing spaced apart from the laser housing, wherein the blower is located in the blower housing; and a duct between the blower housing through which the airflow moves.

34. The laser of claim 33 wherein the duct comprises a flexible hose.

35. The laser of claim 32 further comprising a blower housing connected to the laser housing, and wherein the blower is located in the blower housing.

36. The laser of claim 32 wherein the lasing medium has a longitudinal axis and the housing defines a flow path from the inlet to the outlet having a common direction extending parallel to the longitudinal axis of the lasing medium.

37. An air cooled laser, comprising:

a laser module having a lasing medium with a longitudinal axis and a heat sink having a rectilinear opening attached to the lasing medium, wherein the heat sink has fins extending parallel to the longitudinal axis;

a laser housing containing the laser module, the laser housing having an inlet through which air passes into the laser housing and an outlet through which air flows out of the housing, wherein the housing defines a flow path from the inlet to the outlet having a common direction extending along the fins of the heat sink parallel to the longitudinal axis of the lasing medium; and a high pressure blower coupled to the housing for producing the airflow in the housing to dissipate heat from the heat sink.

38. The laser of claim 37, further comprising a temperature sensor configured to sense a temperature related to the lasing medium and a controller operatively coupled to the temperature sensor and the blower, wherein the controller is configured to control the speed of the blower to maintain the sensed temperature within a desired range.

39. The laser of claim 37, further comprising:

a blower housing spaced apart from the laser housing, wherein the blower is located in the blower housing; and a duct between the blower housing thorough which the airflow moves.

40. The laser of claim 39 wherein the duct comprises a flexible hose.

41. The laser of claim 37 further comprising a blower housing connected to the laser housing, and wherein the blower is located in the blower housing.

* * * * *

UNITED STATES PATENT AND TRADEMARK OFFICE
CERTIFICATE OF CORRECTION

PATENT NO. : 7,415,051 B1  Page 1 of 1
APPLICATION NO. : 10/463105
DATED : August 19, 2008
INVENTOR(S) : Risser et al.

It is certified that error appears in the above-identified patent and that said Letters Patent is hereby corrected as shown below:

On the Title Page Item (54), line 1, delete "COOLER" and insert -- COOLED --, therefor.

In column 1, line 1, delete "COOLER" and insert -- COOLED --, therefor.

In column 3, line 35, delete "all" and insert -- an --, therefor.

In column 3, line 48, delete "tins" and insert -- fins --, therefor.

In column 4, line 14, delete "12" and insert -- 12, --, therefor.

In column 5, line 26, delete "It" and insert -- If --, therefor.

In column 7, line 14, in Claim 20, before "structure to" insert -- outlet --.

In column 8, line 48, in Claim 39, delete "thorough" and insert -- through --, therefor.

Signed and Sealed this

Second Day of December, 2008

JON W. DUDAS
*Director of the United States Patent and Trademark Office*